US012578423B2

(12) United States Patent
Kishida

(10) Patent No.: US 12,578,423 B2
(45) Date of Patent: Mar. 17, 2026

(54) HIGH FREQUENCY CIRCUIT AND RADAR DEVICE

(71) Applicant: Furuno Electric Co., Ltd., Nishinomiya (JP)

(72) Inventor: Takehiro Kishida, Sanda (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 307 days.

(21) Appl. No.: 18/493,695

(22) Filed: Oct. 24, 2023

(65) Prior Publication Data

US 2024/0142569 A1 May 2, 2024

(30) Foreign Application Priority Data

Oct. 27, 2022 (JP) ................................. 2022-172395

(51) Int. Cl.
 *G01S 7/03* (2006.01)
(52) U.S. Cl.
 CPC ...................................... *G01S 7/03* (2013.01)
(58) Field of Classification Search
 CPC .................................. G01S 7/03; H01P 5/028
 See application file for complete search history.

(56) References Cited

U.S. PATENT DOCUMENTS 2,633,493 A * 3/1953 Cohn ......................... H01P 5/10
 333/248
2,802,991 A * 8/1957 Coale ......................... H01P 5/08
 333/34

2,979,676 A * 4/1961 Rueger ................... H01P 5/107
 439/578
3,146,410 A * 8/1964 Butler ..................... H01P 5/107
 333/34
 (Continued)

FOREIGN PATENT DOCUMENTS

DE 4241635 A1 * 6/1994 ............. H01P 5/107
DE 4241635 C2 11/1994
JP 2018067763 A 4/2018

OTHER PUBLICATIONS

Song, L. et al., "Development of an Ultra-Wideband Suspended Stripline to Shielded Microstrip Transition," IEEE Microwave and Wireless Components Letters, vol. 21, No. 9, Sep. 2011, 3 pages.
 (Continued)

*Primary Examiner* — Peter M Bythrow
(74) *Attorney, Agent, or Firm* — Alleman Hall LLP

(57) ABSTRACT

A high frequency circuit and radar device is disclosed. The high frequency circuit includes a microstrip line (MSL), a suspended line (SML), and a connector (MTP). The MSL includes a dielectric substrate having opposing first surfaces and second surfaces, a first signal conductor arranged on the first surface, and a ground conductor arranged on the second surface. The SML includes a dielectric substrate, a second signal conductor arranged on the first surface, and a metal housing arranged from the second surface through a cavity. The MTP includes a dielectric substrate, a signal conductor connecting the first signal conductor and the second signal conductor, and a metal housing arranged from the second surface through a lower cavity. The height of the lower cavity gradually increases from the first end to the second end.

14 Claims, 6 Drawing Sheets

(56)                 References Cited

U.S. PATENT DOCUMENTS

| | | | | |
|---|---|---|---|---|
| 3,932,823 | A * | 1/1976 | Lavedan, Jr. .......... | H01P 5/107 333/35 |
| 4,260,964 | A * | 4/1981 | Saul ....................... | H01P 5/107 333/248 |
| 4,588,962 | A * | 5/1986 | Saito ........................ | H01P 5/12 333/137 |
| 4,901,040 | A * | 2/1990 | Ahlborn ................. | H01P 5/107 333/254 |
| 5,225,797 | A * | 7/1993 | Schary ................. | H01P 5/1022 333/128 |
| 5,262,739 | A * | 11/1993 | Dalman .................. | H03B 7/14 333/34 |
| 5,844,450 | A | 12/1998 | Buer et al. | |
| 6,265,950 | B1 * | 7/2001 | Schmidt ................. | H01P 5/107 333/34 |
| 6,639,487 | B1 * | 10/2003 | Salmela ................. | H01P 5/028 333/34 |
| 7,030,826 | B2 * | 4/2006 | Scorer ..................... | H01P 5/103 343/771 |
| 7,382,212 | B2 * | 6/2008 | Lo Hine Tong ........ | H01P 5/107 333/34 |
| 7,439,822 | B2 * | 10/2008 | Shimura .................. | H01P 5/08 333/34 |
| 8,022,784 | B2 * | 9/2011 | Lee ......................... | H01P 5/107 333/34 |
| 8,564,383 | B2 * | 10/2013 | Shimura ................ | H01P 3/121 333/26 |
| 9,941,568 | B2 * | 4/2018 | Coupez ................ | H05K 1/0243 |
| 11,303,004 | B2 * | 4/2022 | Yung .................... | H01Q 19/132 |
| 12,265,172 | B2 * | 4/2025 | Saqueb ..................... | H01P 1/11 |
| 2005/0133922 | A1 * | 6/2005 | Fjelstad .................. | H01L 23/13 257/E23.07 |
| 2008/0100394 | A1 * | 5/2008 | Margomenos .......... | H01P 1/047 333/32 |
| 2010/0245155 | A1 * | 9/2010 | Miyazato ............ | H01P 1/20345 455/73 |
| 2011/0115578 | A1 * | 5/2011 | Quan ........................ | H01P 5/04 333/238 |
| 2011/0267153 | A1 * | 11/2011 | Hirota ..................... | H01P 5/107 333/33 |
| 2020/0388899 | A1 * | 12/2020 | Yung .................... | H01Q 19/132 |
| 2022/0294096 | A1 * | 9/2022 | Niida ...................... | H01P 5/107 |

OTHER PUBLICATIONS

European Patent Office, Extended European Search Report Issued in Application No. 23205213.4, Mar. 18, 2024, 12 pages.

* cited by examiner

HIGH FREQUENCY CIRCUIT AND RADAR DEVICE

CROSS-REFERENCE TO RELATED APPLICATION(S)

The application claims priority under 35 U.S.C. § 119 to Japanese Patent Application No. 2022-172395, which was filed on Oct. 27, 2022, the entire disclosure of which is hereby incorporated by reference.

TECHNICAL FIELD

Embodiments of the present disclosure relate to the field of electronic circuits, and more particularly, to a high-frequency circuit provided with a transmission line in which a microstrip line and a suspended line are connected.

BACKGROUND

Patent Literature 1 describes a transmission line in which a microstrip line and a suspended line are connected. However, the loss is large at the connector between the microstrip line and the suspended line.

Patent Literature 1: Japanese Patent Publication No. 2014-220628

Hence, there is a need for an improved system to reduce the loss at the connector between the microstrip line and the suspended line which addresses the aforementioned issue(s).

SUMMARY

An objective of the present disclosure is to reduce the loss at the connector between a microstrip line and a suspended line.

In accordance with an embodiment of the present disclosure, a high-frequency circuit is provided. The high-frequency circuit includes a microstrip line. The microstrip line includes a dielectric substrate having a first surface and a second surface opposed to each other. Further, the microstrip line includes a first signal conductor disposed on the first surface and a ground conductor disposed on the second surface. The high-frequency circuit also includes a suspended line. The suspended line includes the dielectric substrate, a second signal conductor disposed on the first surface and a metal layer disposed from the second surface through the first cavity. The high-frequency circuit further includes a connector. The connector includes the dielectric substrate, a connected conductor connecting the first signal conductor to the second signal conductor and a metal layer disposed from the second surface through the second cavity. The connected conductor is designed to widen from a first end connecting to the first signal conductor toward a second end connecting the connected conductor to the second signal conductor. The distance between the dielectric substrate and the metal layer at the second cavity is designed to gradually increase from the first end toward the second end.

In accordance with an embodiment of the present disclosure, a radar is provided. The radar includes a high-frequency circuit. Further, the radar includes a high-frequency element for the radar to be mounted on the microstrip line of the high-frequency circuit.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1A:
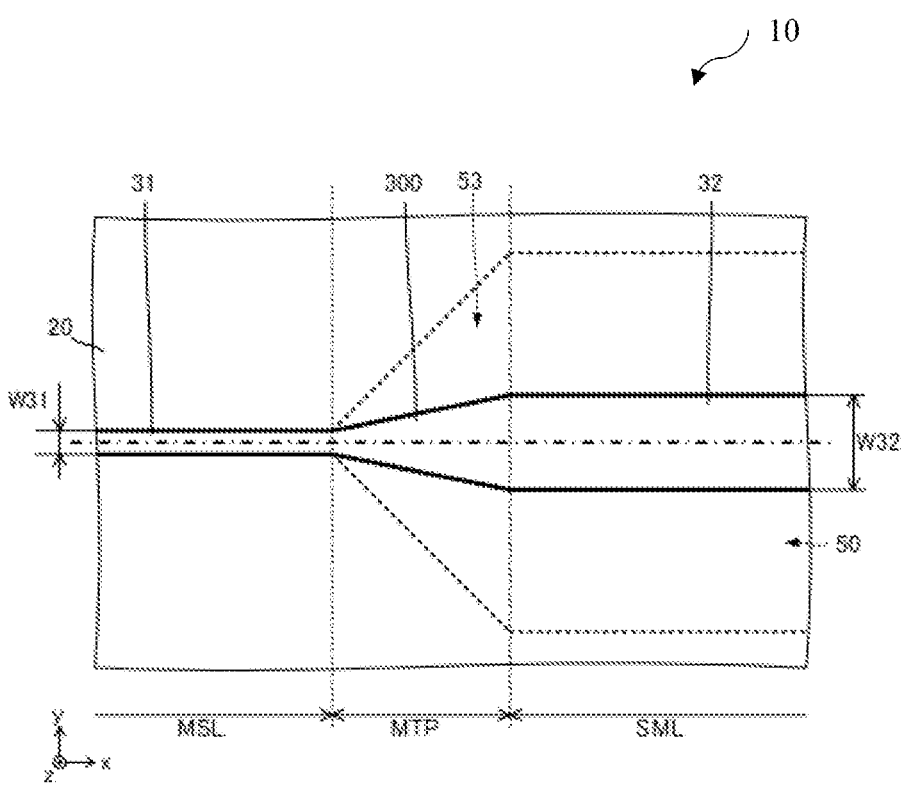
FIG. 1A is a plan view showing a part of a high frequency circuit according to a first embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In accordance with an embodiment of the present disclosure, a high-frequency circuit is provided. The high-frequency circuit includes a microstrip line. The microstrip line includes a dielectric substrate having a first surface and a second surface opposed to each other. Further, the microstrip line includes a first signal conductor disposed on the first surface and a ground conductor disposed on the second surface. The high-frequency circuit also includes a suspended line. The suspended line includes the dielectric substrate, a second signal conductor disposed on the first surface and a metal layer disposed from the second surface through the first cavity. The high-frequency circuit further includes a connector. The connector includes the dielectric substrate, a connected conductor connecting the first signal conductor to the second signal conductor and a metal layer disposed from the second surface through the second cavity. The connected conductor is designed to widen from a first end connecting to the first signal conductor toward a second end connecting the connected conductor to the second signal conductor. The distance between the dielectric substrate and the metal layer at the second cavity is designed to gradually increase from the first end toward the second end.

First Embodiment

Figure 1B:
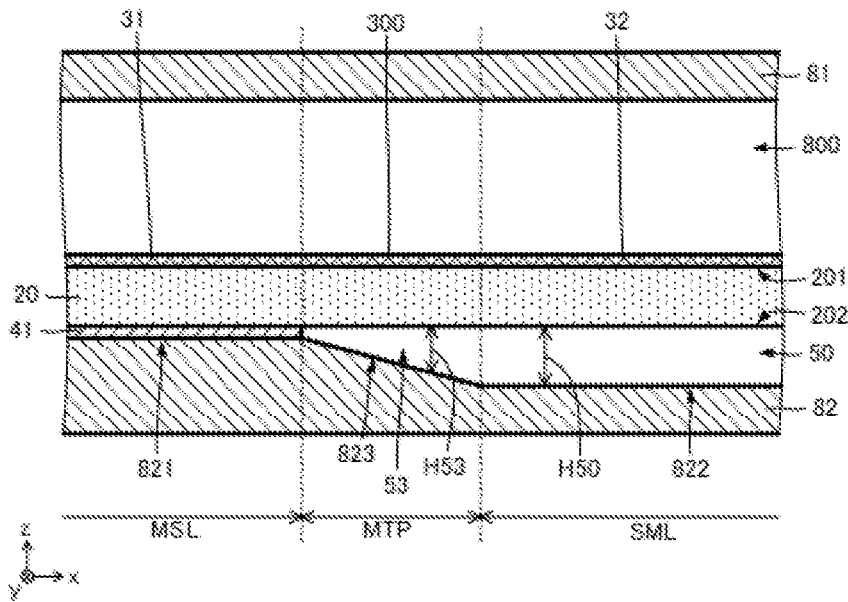
FIG. 1B is a side sectional view showing a part of a high frequency circuit in accordance with a first embodiment of the present disclosure.

FIG. 1A is a plan view showing a part of a high frequency circuit in accordance with a first embodiment of the present disclosure, and FIG. 1B is a side sectional view showing a part of the high frequency circuit in accordance with a first embodiment of the present disclosure. FIG. 1B is a sectional view of a plane parallel to the transmission direction of a high-frequency signal.

Figure 2A:
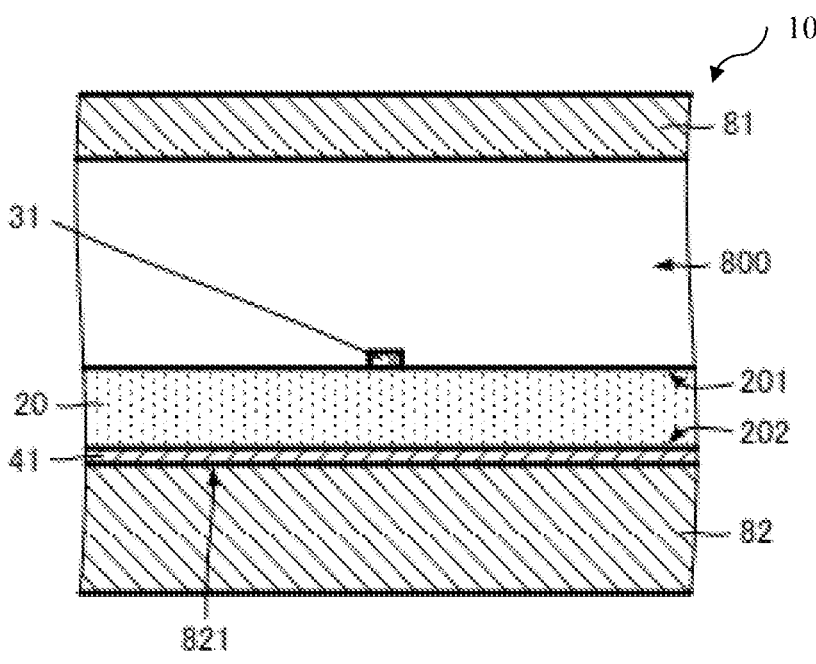
FIG. 2A and FIG. 2B are sectional views of a high frequency circuit in accordance with the first embodiment of the present disclosure.
Figure 2B:
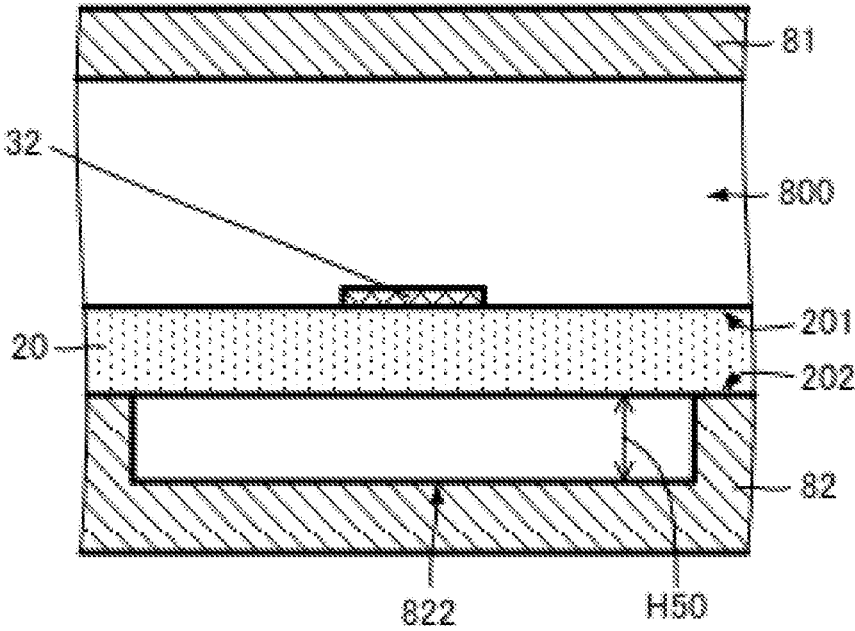

FIGS. 2A and 2B are sectional views of a high-frequency circuit in accordance with a first embodiment of the present disclosure. FIG. 2A and FIG. 2B are cross-sectional views of a surface orthogonal to the transmission direction of the high-frequency signal. FIG. 2A is a cross-sectional view of a portion of the microstrip line, and FIG. 2B is a cross-sectional view of a portion of the suspended line.

As shown in FIG. 1A, FIG. 1B, FIG. 2A, and FIG. 2B, the high-frequency circuit (10) includes a dielectric substrate (20), a first signal conductor (31), a second signal conductor (32), a signal conductor (connected conductor) (300, 300A), a ground conductor (41), a metal housing (81), and a metal housing (82).

The dielectric substrate (20) is a substrate having a predetermined dielectric constant. The dielectric substrate (20) is, for example, a substrate such as FR-4 using a glass epoxy resin. The dielectric substrate (20) is a flat plate having a first surface (201) and a second surface (202) facing each other and having a constant thickness.

The first signal conductor (31), the second signal conductor (32), and the signal conductor (300) are arranged on the first surface (201) of the dielectric substrate (20). The first signal conductor (31) and the second signal conductor (32) are connected through the signal conductor (300).

The first signal conductor (31) is a linear (band-like) flat film conductor having a width W31. The second signal conductor (32) is a linear (band-like) flat film conductor having a width W32. The width W31 of the first signal conductor (31) is narrower than the width W32 of the second signal conductor (32). In other words, the width W32 of the second signal conductor (32) is wider than the width W31 of the first signal conductor (31).

The signal conductor (300) has a first end connected to the first signal conductor (31) and a second end connected to the second signal conductor (32). The signal conductor (300) is a linear (banded) flat film conductor whose width varies between the first end and the second end. The signal conductor (300) has a shape that increases in width from the first end to the second end and may also have a shape that increases in width gradually.

At this time, the width of the signal conductor (300) increases continuously. In other words, the signal conductor (300) has no place where the width varies discretely between the first end and the second end.

The width at the first end of the signal conductor (300) is the same as the width W31 of the first signal conductor (31). The width at the second end of the signal conductor (300) is the same as the width W32 of the second signal conductor (32).

The ground conductor (41) is disposed on the second surface (202) of the dielectric substrate (20). The ground conductor (41) is a flat film conductor. The ground conductor (41) overlaps the first signal conductor (31) in plan view (in the z-axis direction of the figure) and does not overlap the signal conductors (300) and (32).

The width of the ground conductor (41) is wider than the width W31 of the first signal conductor (31). Specifically, the width of the ground conductor (41) is wide enough to have little adverse effect on the electric field formation and transmission characteristics of the microstrip line (MSL), which will be described later, as a high-frequency circuit (10).

The metal housing (81) is disposed on the side of the first surface (201) of the dielectric substrate (20) through the upper cavity (800). The height of the upper cavity (800) is such that the first signal conductor (31), the second signal conductor (32), the signal conductor (300), and the metal housing (81) are hardly electromagnetically coupled.

The metal housing (82) is arranged on the side of the second surface (202) of the dielectric substrate (20). The metal housing (82) has a first portion overlapping the first signal conductor (31), a second portion overlapping the second signal conductor (32), and a third portion overlapping the signal conductor (300) in a plane view in the direction (x-axis direction in the figure) in which the first signal conductor (31), the signal conductor (300), and the second signal conductor (32) are connected.

The height of the first portion is higher than the height of the second portion. The height of the third portion gradually decreases from the end connected to the first portion to the end connected to the second portion. At this time, the height of the third portion is continuously lowered. In other words, the third portion has no portion where the height varies discretely between the end portion connected to the first portion and the end portion connected to the second portion.

The metal housing (82) is arranged such that the main surface (821) of the first portion abuts the ground conductor (41). Thus, a lower cavity (50) is formed between the main surface (822) of the second portion of the metal housing (82) and the second surface (202) of the dielectric substrate (20). A lower cavity (53) is formed between the main surface (823) of the third portion of the metal housing (82) and the second surface (202) of the dielectric substrate (20). The lower cavity (50) communicates with the lower cavity (53). In the microstrip line, the metal housing (82) may play the role of the ground conductor (41).

The height H50 (the distance in the height direction (z-axis direction) between the main surface (822) and the second surface (202) of the lower cavity (50) is constant. The width of the lower cavity (50) is wider than the width of the second signal conductor (32) and is wide enough to have little adverse effect on the electric field formation and transmission characteristics of the suspended-line (SML) described later as the high-frequency circuit (10).

The height H53 (the distance in the height direction (z-axis direction) between the main surface (823) and the second surface (202) of the lower cavity (53) gradually increases from the end portion on the side of the first signal conductor (31) toward the end portion on the side of the second signal conductor (32) because the metal housing (82) has the above-mentioned shape. At this time, the height H53 is continuously increased. The height H53 of the lower cavity (53) is the same as the height H50 of the lower cavity (50) at the end portion communicating with the lower cavity (50).

The width of the lower cavity (53) gradually increases from the end portion on the side of the first signal conductor (31) toward the end portion on the side of the second signal conductor (32). The width of the lower cavity (53) is the same as the width of the lower cavity (50) at the end portion communicating with the lower cavity (50).

With this configuration, the high-frequency circuit (10) includes a microstrip line (MSL), a suspended line (SML), and a connector (MTP).

The microstrip line (MSL) is formed of the first signal conductor (31), a dielectric substrate (20), and a ground conductor (41).

The suspended line (SML) is formed of the second signal conductor (32), a dielectric substrate (20), a lower cavity (50), and a metal housing (82).

The connector (MTP) is formed of a signal conductor (300), a dielectric substrate (20), a lower cavity (53), and a metal housing (82).

In this configuration, the width W31 of the first signal conductor (31) of the microstrip line (MSL) is narrower than the width W32 of the second signal conductor (32) of the suspended line (SML). As a result, the high-frequency circuit (10) can make the characteristic impedance of the suspended line (SML) having the lower cavity (50) (air layer) between the second signal conductor (32) and the metal housing (82) the same as the characteristic impedance of the microstrip line (MSL).

By using the suspended line (SML), the transmission loss of the high-frequency circuit (10) can be reduced compared with using the microstrip line (MSL) alone. In particular, when the frequency of the high-frequency signal is high, the loss becomes larger when a general-purpose and inexpensive dielectric substrate (20) such as FR-4 is used, but the transmission loss of the high-frequency circuit (10) can be effectively reduced by using the suspended line (SML).

In this case, the height H50 of the lower cavity (50) is preferably larger than the thickness of the dielectric substrate (20). Thus, the high-frequency circuit (10) can further suppress the transmission loss in the suspended line (SML).

In the high-frequency circuit (10), the width of the signal conductor (300) of the connector MTP gradually increases from the first end on the microstrip line (MSL) side to the second end on the suspended line (SML) side. As a result, the electric field distribution and the transmission mode do not suddenly change in the connector MTP, but gradually change. Therefore, the high-frequency circuit (10) can suppress the connection loss between the microstrip line (MSL) and the suspended line (SML).

Furthermore, in the high-frequency circuit (10), the height H53 of the lower cavity (53) of the connector MTP gradually increases from the first end of the microstrip line (MSL) side to the second end of the suspended line (SML) side. As a result, the electric field distribution and the transmission mode do not suddenly change in the connector MTP, but gradually change. Therefore, the high-frequency circuit (10) can suppress the loss in the connector MTP.

Further, in the high-frequency circuit (10), the width of the lower cavity (53) of the connector MTP gradually increases from the first end of the microstrip line (MSL) side to the second end of the suspended line (SML) side. As a result, the electric field distribution and the transmission mode do not suddenly change in the connector MTP, but gradually change. Therefore, the high-frequency circuit (10) can suppress the loss in the connector MTP. The width of the lower cavity (53) of the connector MTP may be equal to or greater than the width of the second signal conductor (32) of the suspended line.

Figure 3A:
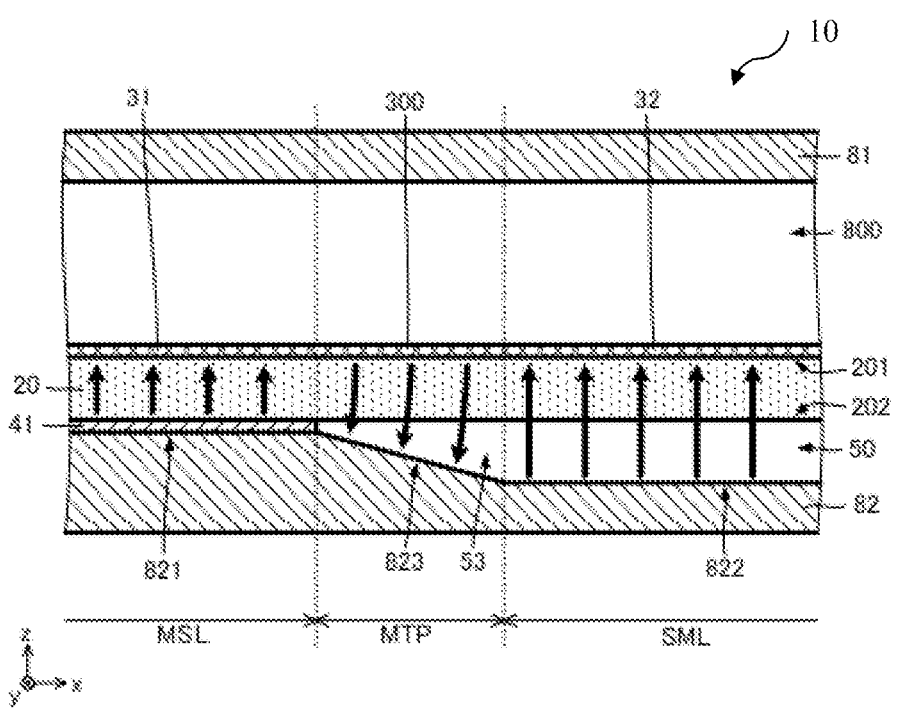
FIG. 3A is a side sectional view schematically showing an electric field distribution of a high frequency circuit of the present disclosure.
Figure 3B:
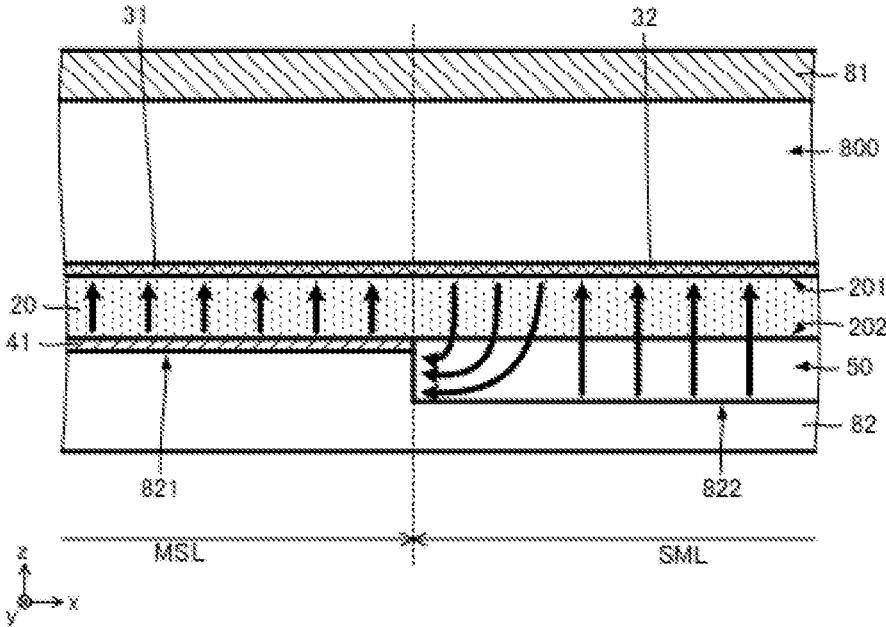
FIG. 3B is a side sectional view schematically showing an electric field distribution of a high frequency circuit in a comparative configuration in accordance with an embodiment of the present disclosure.

FIG. 3A is a side sectional view schematically showing the electric field distribution of the high-frequency circuit of the present disclosure, and FIG. 3B is a side sectional view schematically showing the electric field distribution of the high-frequency circuit of the comparative configuration in accordance with an embodiment of the present disclosure.

Figure 4A:
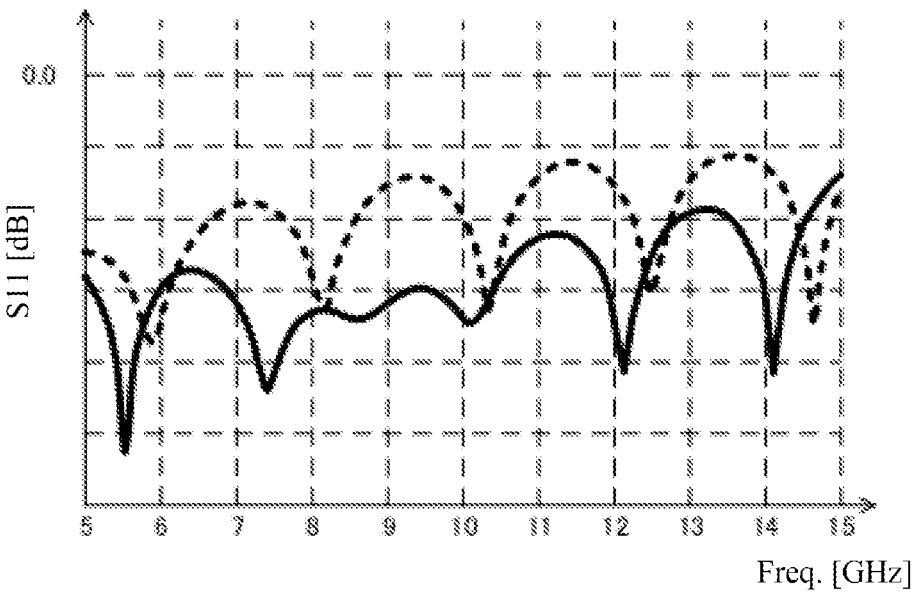
FIG. 4A is a graph showing S11 characteristics between a high frequency circuit of the present disclosure and a high frequency circuit in a comparative configuration.
Figure 4B:
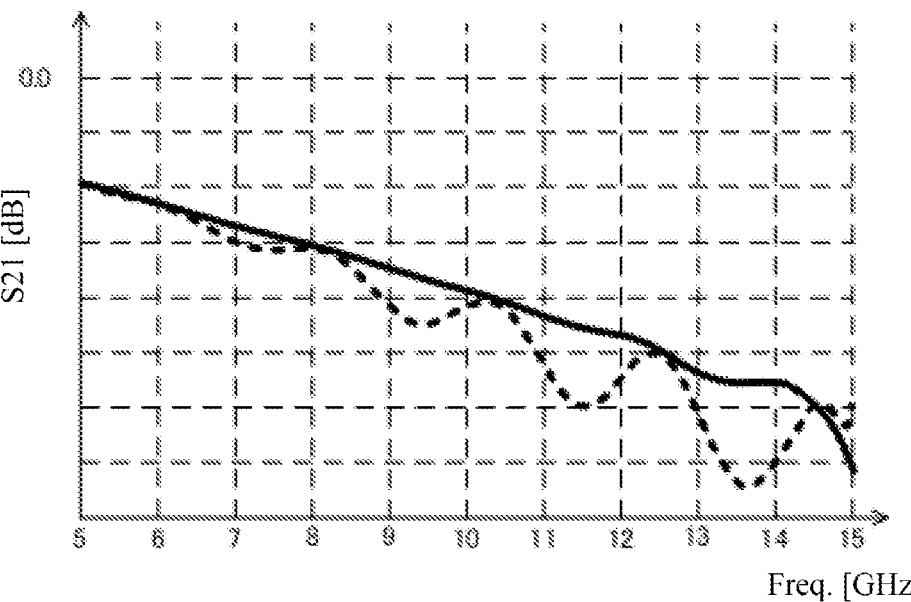
FIG. 4B is a graph showing S21 characteristics between a high frequency circuit of the present disclosure and a high frequency circuit in a comparative configuration in accordance with an embodiment of the present disclosure.

FIG. 4A is a graph showing S11 characteristics between the high-frequency circuit of the present disclosure and the high-frequency circuit of the comparative configuration, and FIG. 4B is a graph showing S21 characteristics between the high-frequency circuit of the present disclosure and the high-frequency circuit of the comparative configuration. In FIGS. 4A and 4B, solid lines indicate S11 characteristics and S21 characteristics of the high-frequency circuit of the present disclosure, while dashed lines indicate S11 characteristics and S21 characteristics of the high-frequency circuit of the comparative configuration.

The comparative configuration is a configuration in which the microstrip line (MSL) and the suspended line (SML) are directly connected without the connector MTP of the present disclosure.

As shown in FIGS. 3A and 3B, the high-frequency circuit (10) of the present disclosure can suppress the sudden change of the electric field distribution as in the comparative configuration at the point where the microstrip line (MSL) and the suspended line (SML) are connected.

As a result, the high-frequency circuit (10) of the present disclosure can realize superior S11 characteristics and superior S21 characteristics than the comparative configuration and can reduce the loss at the point where the microstrip line (MSL) and the suspended line (SML) are connected.

The high-frequency circuit 10 of this configuration is applied to the radar (90), for example.

Figure 5A:
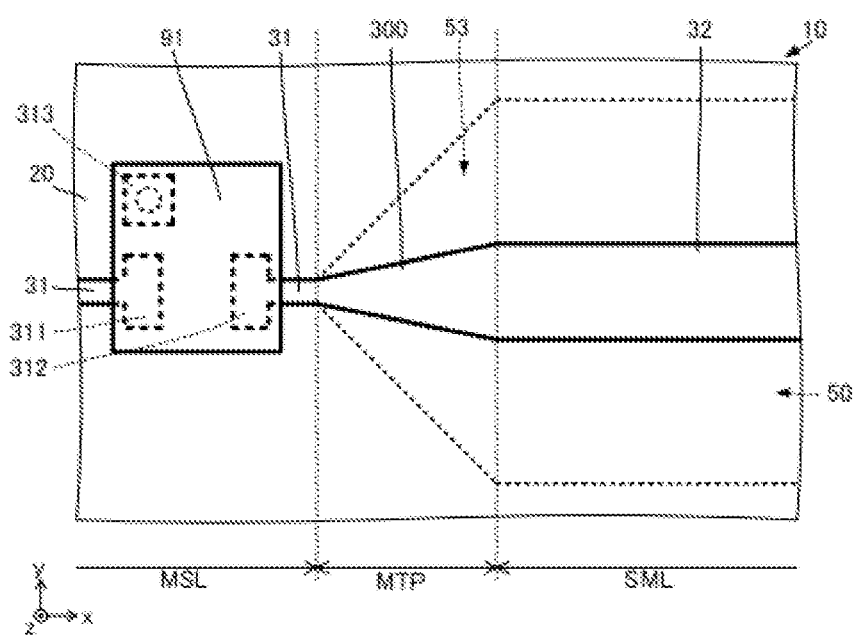
FIG. 5A is a plan view showing a part of the radar apparatus.
Figure 5B:
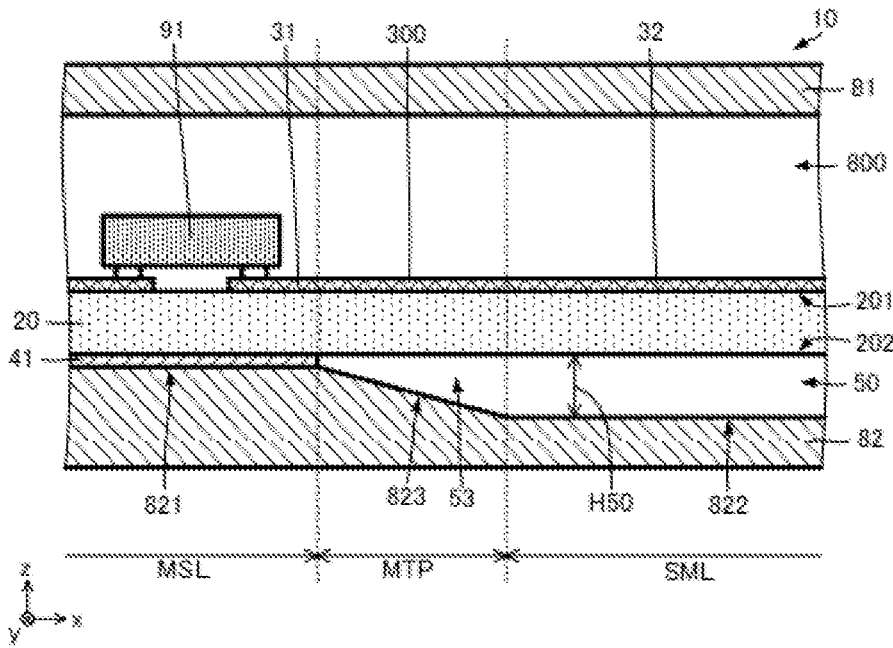
FIG. 5B is a side sectional view showing a part of the radar apparatus in accordance with an embodiment of the present disclosure.

FIG. 5A is a plan view showing a part of the radar (90) apparatus, and FIG. 5B is a side sectional view showing a part of the radar (90) apparatus in accordance with an embodiment of the present disclosure.

As shown in FIG. 5A, the radar (90) apparatus includes a high-frequency circuit (10) and a high-frequency element (91). The high-frequency element (91) is, for example, a high-power amplifier or the like, and is, for example, an element used in a transmission circuit or a reception circuit of a radar (90). The high-frequency element (91) is not limited thereto, but also includes a passive element such as a capacitor.

The high-frequency element (91) is mounted on terminal conductors (311) and (312) connected to the first signal conductor (31) in the microstrip line (MSL). The high-frequency element (91) has a ground terminal, which is mounted on a terminal conductor (313) formed on the first surface (201) of the dielectric substrate (20). The terminal conductor (313) is connected to the ground conductor (41) through a via conductor formed on the dielectric substrate (20).

Thus, the radar (90) mounts the high-frequency element (91) with the ground terminal at the location of the microstrip line (MSL). Thus, the radar (90) can reliably and easily mount the high-frequency element (91) with the ground terminal in the high-frequency circuit (10).

In addition, the radar (90) uses a suspended line (SML) in a part where the high-frequency element (91) is not mounted. Thus, the radar (90) can suppress the transmission loss and realize a highly efficient radar. In this case, the portion using the suspended line (SML) is preferably longer than the portion using the microstrip line (MSL). As a result, the radar (90) can further suppress transmission loss and realize a highly efficient radar.

Although the radar (90) is shown as an example in the present embodiment, the above-described configuration of the high-frequency circuit (10) can be adopted in the case of a high-frequency device in which electronic components are mounted. Thus, the loss of the high-frequency device can be reduced, and the characteristics of the high-frequency device can be improved.

Although not shown, the metal casing (81) and the metal casing (82) are fixed across the dielectric substrate (20) so as to include the dielectric substrate (20), the first signal conductor (31), the second signal conductor (32), the signal conductor (300), and the ground conductor (41). Thus, the electromagnetic field coupling between the metal casing (81) and the metal casing (82), the microstrip line (MSL), the suspended line (SML), and the connector MTP, which will be described later, and the outside of the metal casing (81) and the metal casing (82) can be suppressed.

In the above description, the metal casing (82) is used for the metal layer coupled to the second signal conductor (32) in the suspended line (SML), and for the metal layer coupled to the signal conductor (300) in the connector MTP. However, for example, an electrode film (metal film) may be formed on a dielectric substrate different from the dielectric substrate (20), and the electrode film (metal film) may be used as a metal layer.

By using the metal housing (82) as a metal layer, the high-frequency circuit (10) can be realized in a simple configuration. On the other hand, by separately providing the dielectric substrate (20), the height of the lower cavity (50) of the suspended line (SML) and the height of the lower cavity (53) of the connector MTP can be set without affecting the shape of the metal housing (82).

Second Embodiment

Figure 6A:
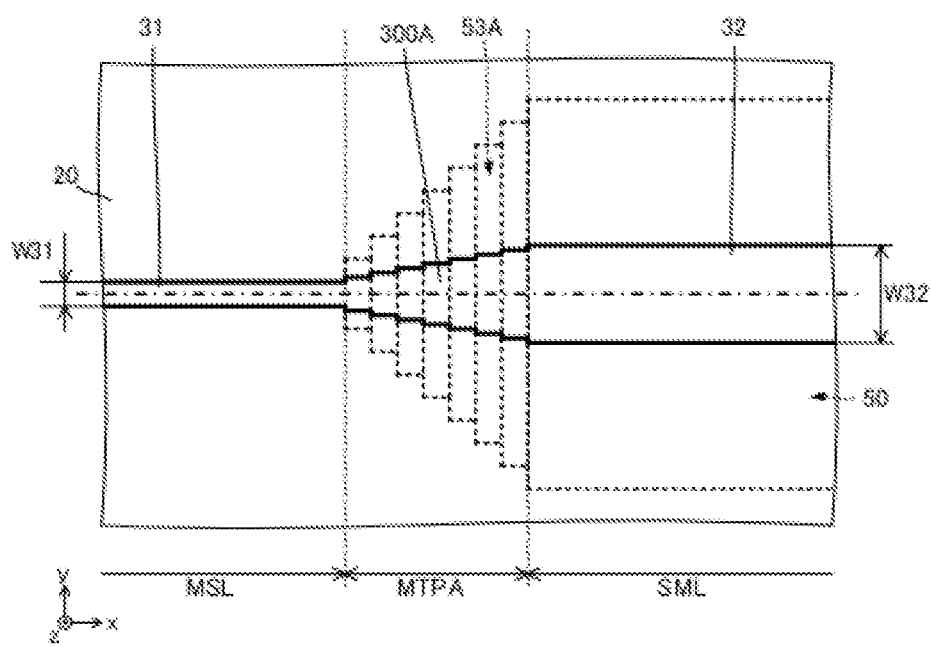
FIG. 6A is a plan view showing a part of the high frequency circuit according to a second embodiment of the present disclosure.

A high-frequency circuit according to a second embodiment of the present disclosure will be described with reference to the figure. FIG. 6A is a plan view showing a part of a high-frequency circuit according to a second embodiment of the present disclosure, and FIG. 6B is a side sectional view showing a part of a high-frequency circuit in accordance with a second embodiment of the present disclosure.

Figure 6B:
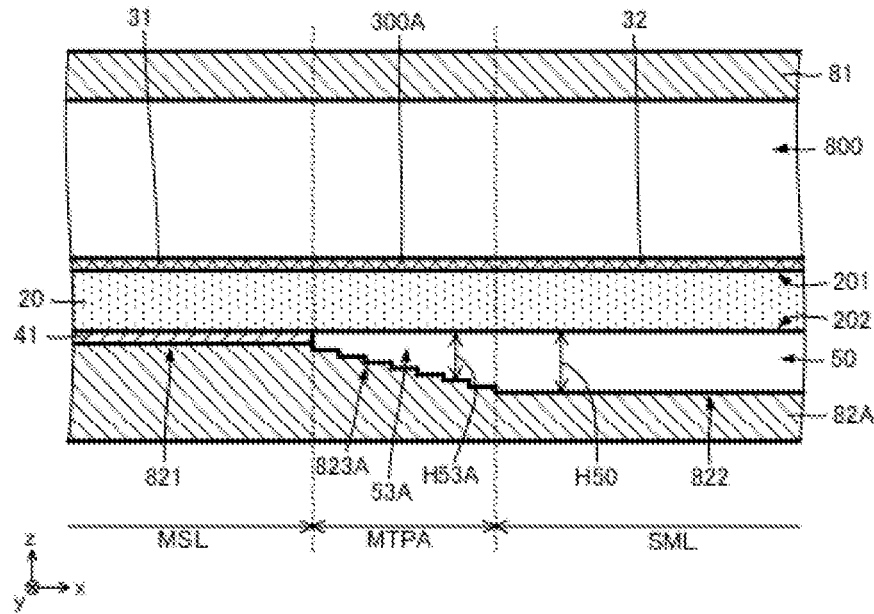
FIG. 6B is a side sectional view showing a part of the high frequency circuit in accordance with a second embodiment of the present disclosure.

As shown in FIGS. 6A and 6B, the high-frequency circuit (10A) according to the second embodiment is different from the high-frequency circuit (10) according to the first embodiment in that it has a connector MTPA. The other configuration of the high-frequency circuit (10A) is the same as that of the high-frequency circuit (10), and the description of the similar elements will be omitted.

The high-frequency circuit (10A) includes a connector MTPA. The connector MTPA includes a signal conductor (300A), a metal housing (82A), and a lower cavity (53A).

The width of the signal conductor (300A) varies discretely (stepwise) from the first end connecting to the first signal conductor (31) to the second end connecting to the second signal conductor (32).

The height of the third portion of the metal housing (82A) decreases discretely from the end on the side of the first signal conductor (31) toward the end on the side of the second signal conductor (32). That is, the height H53A of the lower cavity (53A) increases discretely toward the side communicating with the lower cavity (50).

The width of the lower cavity (53A) is discretely increased toward the side communicating with the lower cavity (50).

With such a configuration, the high-frequency circuit (10A) can suppress the connection loss between the microstrip line (MSL) and the suspended line (SML) as well as the high-frequency circuit (10).

Various embodiments of the present disclosure provides a high-frequency circuit that includes a microstrip line, a suspended line, and a connector. The high-frequency circuit enables several advantages as listed below:

1. The transmission mode gradually changes from the microstrip line to the suspended line or from the suspended line to the microstrip line. This reduces the transmission loss between the microstrip line and the suspended line.

2. The width of the connected conductor is designed to vary continuously, and to be the width of the first signal conductor at the first end and the width of the second signal conductor at the second end. In this configuration, transmission loss can be further suppressed.

3. The width of the connected conductor is designed to vary gradually and discretely, and to be the width of the first signal conductor at the first end and the width of the second signal conductor at the second end. In this configuration, manufacturing is made easier while realizing a predetermined transmission loss.

4. The distance between the dielectric substrate and the metal layer at the second cavity is designed to vary continuously, and to be the distance between the dielectric substrate and the metal layer at the first cavity at the second end. In this configuration, transmission loss can be further suppressed.

5. The dielectric substrate and the metal layer at the second cavity is designed to vary discretely, and to be the distance between the dielectric substrate and the metal layer at the first cavity at the second end. In this configuration, manufacturing is made easier while realizing a predetermined transmission loss.

6. The metal layer is a metal housing surrounding the microstrip line and the suspended line. In this configuration, the metal housing surrounding the high-frequency circuit and shielding it electromagnetically can be used for the suspended line and the connector.

7. The metal layer is a metal film formed on an insulator. In this configuration, the shape of the suspended line and the connector can be realized separately from the metal housing, and the design freedom of the suspended line and the connector can be improved.

8. The radar is mounted on a microstrip line of the high frequency circuit. In this configuration, a low loss radar can be realized. In particular, a low loss radar can be realized while using an inexpensive dielectric substrate.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A high-frequency circuit comprising:
a dielectric substrate having a first surface and a second surface opposed to each other;
a metal layer;
a microstrip line comprising:
  a first signal conductor disposed on the first surface of the dielectric substrate; and a ground conductor disposed between the second surface of the dielectric substrate and the metal layer;
a suspended line comprising:
  a second signal conductor disposed on the first surface of the dielectric substrate; and
  a lower cavity disposed between the second surface of the dielectric substrate and the metal layer; and
a connector comprising:
  a connected conductor disposed on the first surface of the dielectric substrate, the connected conductor connecting the first signal conductor to the second signal conductor; and
  a transitional lower cavity disposed between the second surface of the dielectric substrate and the metal layer, wherein:
a width of the connected conductor continuously increases from a first end connecting to the first signal conductor toward a second end connecting to the second signal conductor; and
a height of the transitional lower cavity continuously increases from the first end toward the second end.

2. The high-frequency circuit of claim 1, wherein the width of the connected conductor is designed:
to vary continuously; and
to be the width of the first signal conductor at the first end and the width of the second signal conductor at the second end.

3. The high-frequency circuit of claim 1, wherein the width of the connected conductor is designed:
to vary gradually and discretely; and
to be the width of the first signal conductor at the first end and the width of the second signal conductor at the second end.

4. The high-frequency circuit of claim 1, wherein the distance between the dielectric substrate and the metal layer at the transitional lower cavity is designed:
to vary continuously; and
to be the distance between the dielectric substrate and the metal layer at the lower cavity at the second end.

5. The high-frequency circuit of claim 1, wherein the distance between the dielectric substrate and the metal layer at the transitional lower cavity is designed:
to vary discretely; and
to be the distance between the dielectric substrate and the metal layer at the lower cavity at the second end.

6. The high-frequency circuit of claim 1, wherein the metal layer is a metal enclosure surrounding the microstrip line and the suspended line.

7. The high-frequency circuit of claim 1, wherein the metal layer is a metal film formed on an insulator.

8. A radar comprising:
a high-frequency circuit according to claim 1; and
a high-frequency element for the radar to be mounted on the microstrip line of the high-frequency circuit.

9. A radar comprising:
a high-frequency circuit according to claim 2; and
a high-frequency element for the radar to be mounted on the microstrip line of the high-frequency circuit.

10. A radar comprising:
a high-frequency circuit according to claim 3; and
a high-frequency element for the radar to be mounted on the microstrip line of the high-frequency circuit.

11. A radar comprising:
a high-frequency circuit according to claim 4; and
a high-frequency element for the radar to be mounted on the microstrip line of the high-frequency circuit.

12. A radar comprising:

a high-frequency circuit according to claim 5; and a high-frequency element for the radar to be mounted on the microstrip line of the high-frequency circuit.

13. A radar comprising:

a high-frequency circuit according to claim 6; and a high-frequency element for the radar to be mounted on the microstrip line of the high-frequency circuit.

14. A radar comprising:

a high-frequency circuit according to claim 7; and a high-frequency element for the radar to be mounted on the microstrip line of the high-frequency circuit.

* * * * *